United States Patent [19]

Baba et al.

[11] Patent Number: 5,172,931
[45] Date of Patent: Dec. 22, 1992

[54] MODULAR COVER FOR AN AIR BAG

[75] Inventors: Yoshiyuki Baba; Takayasu Zushi, both of Shiga, Japan

[73] Assignee: Takata Corporation, Tokyo, Japan

[21] Appl. No.: 770,236

[22] Filed: Oct. 3, 1991

[30] Foreign Application Priority Data

Oct. 26, 1990 [JP] Japan ................. 2-290545

[51] Int. Cl.$^5$ .............................................. B60R 21/16
[52] U.S. Cl. ................................ 280/728; 280/731
[58] Field of Search ............ 280/728, 743, 731, 732, 280/751, 752; 428/167, 179

[56] References Cited

U.S. PATENT DOCUMENTS

| 3,812,002 | 5/1974 | Lurie | 428/167 |
| 4,640,854 | 2/1987 | Radtke | 428/179 |
| 4,826,723 | 5/1989 | Brambach | 428/167 |
| 5,060,971 | 10/1991 | Nanbu et al. | 280/728 |
| 5,082,310 | 1/1992 | Bauer | 280/743 |

FOREIGN PATENT DOCUMENTS

| 3742233 | 7/1989 | Fed. Rep. of Germany | 428/167 |
| 3034814 | 2/1991 | Japan | 280/728 |
| 1516586 | 10/1989 | U.S.S.R. | 428/167 |

Primary Examiner—Tamara L. Graysay
Attorney, Agent, or Firm—Kanesaka and Takeuchi

[57] ABSTRACT

A modular cover for an air bag comprises a rigid inner layer, a soft outer layer, and a tear line along which the modular cover is torn. The tear line includes a raised portion extending from the inner layer into the outer layer, and a recessed portion formed in the inner surface of the modular cover. The modular cover includes a convexed portion extending from the inner layer into the outer layer and located adjacent to the tear line so as to prevent the outer layer from suffering from depressions.

6 Claims, 3 Drawing Sheets

MODULAR COVER FOR AN AIR BAG

BACKGROUND OF THE INVENTION

1. Field of the Invention

The present invention relates to an air bag system wherein an air bag is inflated when impact or deformation is sensed in the event of a vehicle collision and more particularly, to a modular cover adapted to contain an air bag in the system.

2. Description of the Related Art

A conventional modular cover for use in an air bag is illustrated in FIG. 4 and includes a rigid inner layer 11, and a soft outer layer 12. The modular cover is torn along a tear line 13 when the air bag is inflated. The modular cover is made by a two-color molding process wherein two resins are separately injected into a common mold.

During two-color molding process, such a modular cover, composed of inner and outer layers shown in FIG. 4, is subject to shrinkage (sink mark or depression) when resins are cured.

Specifically, depressions (shrinkage) results from curing of the outer layer 12 as shown in FIG. 5. FIG. 5 is an enlarged view of a portion V of the modular cover shown in FIG. 4. Depression or dimples 20 are formed on the surface 12a of the outer layer 12 adjacent to the tear line 13. This deteriorates the appearance of the modular cover. The arrows 21 show the directions in which the material is shrunk.

OBJECT AND SUMMARY OF THE INVENTION

In order to solve the foregoing problem, it is an object of the present invention to provide a modular cover for an air bag which is free from depressions due to shrinkage when the outer layer is molded.

Accordingly, the present invention has for its object to provide a high quality modular cover which has a high yield and is efficiently produced.

According to the present invention, there is provided a modular cover for an air bag comprising a rigid inner layer, a soft outer layer, and a tear line along which the modular cover is torn, the tear line including a raised portion extending from the inner layer into the outer layer, and a recessed portion formed in the inner surface of the modular cover, wherein a convexed portion extends from the inner layer into the outer layer and is located adjacent to the tear line so as to prevent the outer layer from suffering from depressions.

With the modular cover of the present invention, the convexed portion is formed in the inner layer to prevent depressions on the outer layer. This arrangement dissipates stress due to shrinkage when the outer layer is cured and thus, prevents local depressions on the outer layer adjacent to the tear line.

BRIEF DESCRIPTION OF THE DRAWINGS

A better understanding of the present invention may be made to the following description of preferred embodiments when taken in conjunction with the accompanying drawings, in which.

DESCRIPTION OF THE PREFERRED EMBODIMENTS

Figure 1:
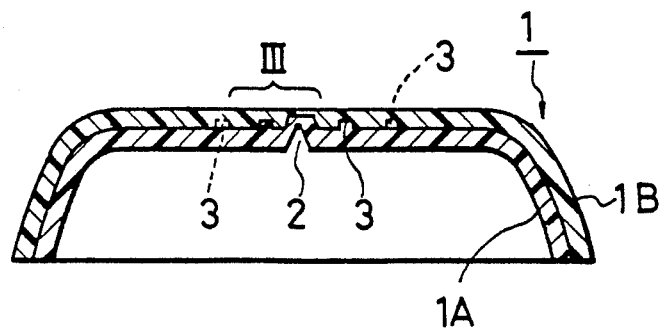
FIG. 1 is a sectional view of a modular cover for an air bag made according to one embodiment of the present invention.
Figure 2:
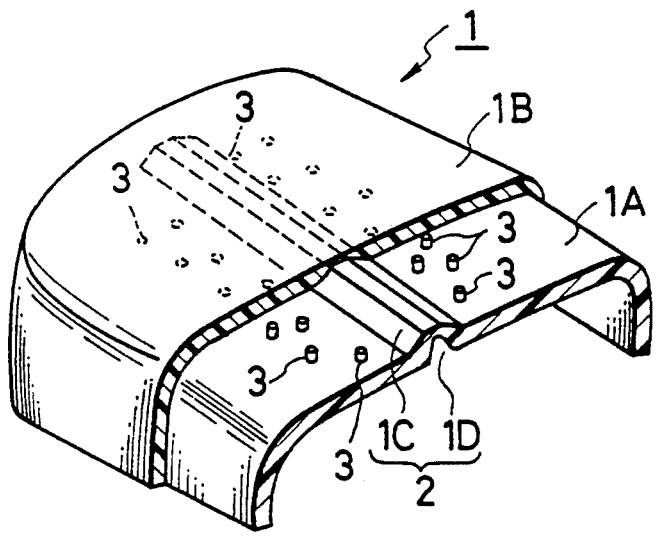
FIG. 2 is a perspective view, partly in section, of the modular cover shown in FIG. 1.
Figure 3:
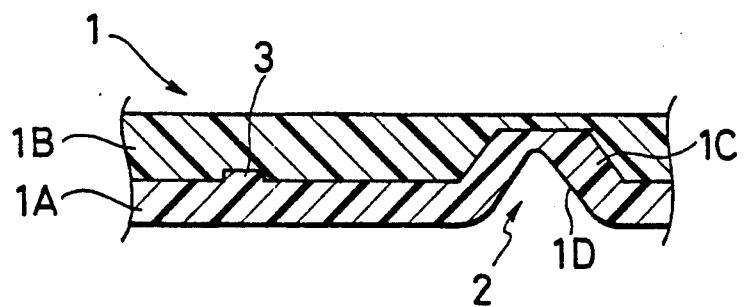
FIG. 3 is an enlarged view of a portion III of the modular cover shown in FIG. 1.
Figure 4:
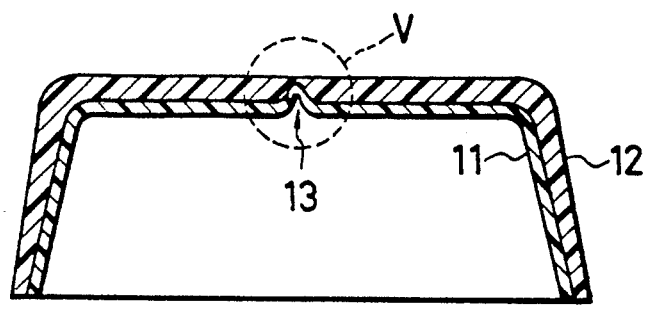
FIG. 4 is a sectional view of a conventional modular cover.
Figure 5:
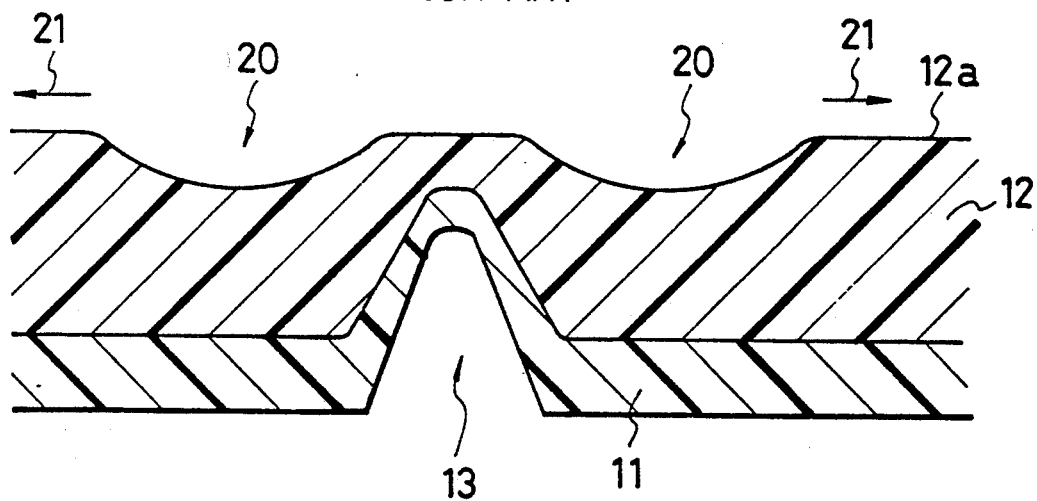
FIG. 5 is an enlarged view of a portion V, of the modular cover shown in FIG. 4.

Referring to FIGS. 1 to 3, a modular cover 1 is mounted centrally in the steering wheel of a vehicle and includes a rigid inner layer 1A, and a soft outer layer 1B. The modular cover 1 is torn along a tear line 2. The tear line 2 includes a raised portion 1C extending from the inner layer 1A into the outer layer 1B, and a recessed portion 1D formed in the inner surface of the modular cover 1.

A number of projections 3 is formed on the inner layer 1A adjacent to the tear line 2 so as to prevent the outer layer 1B from suffering from depressions.

The projections 3 dissipate stress due to shrinkage which may occur when the outer layer is cured. This prevents depressions on the outer layer 1B.

It is not essential in the present invention that the convexed portion be in the form of projections as shown in FIGS. 1 to 3. It may be in the form of elongated projections.

Figure 6:
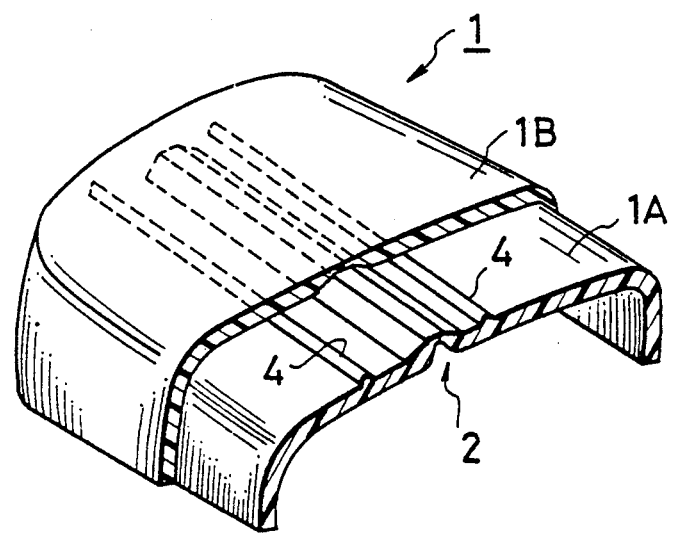
FIGS. 6 and 7 are perspective views, in section, of a modular cover made according to another embodiment of the present invention.
Figure 7:
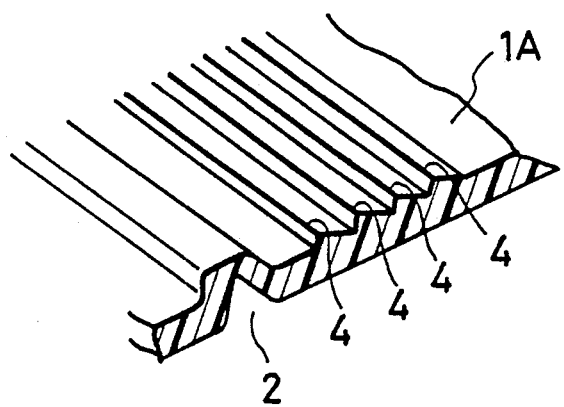

FIG. 6 is a perspective view, partly in section, of the modular cover on which two elongated projections 4 extend parallel to and adjacent to the tear line 2. In FIG. 6, two projections 4 are located at opposite sides of the tear line 2. Alternatively, a plurality of projections 4 may be formed at each side of the tear line 2, as shown in FIG. 7. The projections 4 may be wavy.

According to the present invention, the inner layer may have both the projections 3 and the elongated projections 4.

The projections 3 may be cylindrical, quandratical, conical, or frustoconical or may take any other shape.

I claim:

1. A modular cover for an air bag comprising:
   a rigid inner layer having outer and inner surfaces,
   a soft outer layer directly molded over the outer surface of the inner layer and having a smooth outer surface without depressions,
   a tear line formed in the inner and outer layers for tearing the modular cover when the air bag is opened, said tear line being formed of a raised portion formed in the inner layer and extending outwardly from the outer surface of the inner layer, a recessed portion formed in the raised portion and extending toward the outer layer from the inner surface of the inner layer, and a thin portion formed in the outer layer and located above the raised portion, and
   a plurality of convex portions integrally formed with the inner layer to extend outwardly from the outer surface thereof and to engage the outer layer, said convex portions being located near and along the tear line so that when the outer layer is molded and cured, a portion near the tear line does not partly shrink to thereby substantially form the smooth outer surface without forming a depression along the tear line.

2. A modular cover according to claim 1, wherein said convexed portion includes a number of projections.

3. A modular cover according to claim 1, wherein said convexed portion includes elongated projections.

4. A modular cover according to claim 3, wherein said convexed portion extends parallel to said tear line.

5. A modular cover according to claim 1, wherein said inner layer on the tear line defined by the recessed portion has a thickness less than that of a portion outside the tear line.

6. A modular cover for an air bag comprising:
- a rigid inner layer having outer and inner surfaces,
- a soft outer layer directly molded over the outer surface of the inner layer after the inner layer is molded, said outer layer having a flat outer surface,
- a tear line formed in the inner and outer layers for tearing the modular cover when the air bag is opened, said tear line being formed of a raised portion formed in the inner layer and extending outwardly from the outer surface of the inner layer, a recessed portion formed in the raised portion and extending toward the outer layer from the inner surface of the inner layer, and a thin portion formed in the outer layer and located above the raised portion, and
- a plurality of projections integrally formed with the inner layer to extend outwardly from the outer surface thereof, said projections being located near and along the tear line on both sides of the tear line and having heights less than a thickness of the outer layer so that when the outer layer is molded and cured, the projections dissipate stress of the outer layer near the tear line due to shrinkage to thereby substantially form the flat outer surface without forming depressions along the tear line.

* * * * *